(12) United States Patent
Ruck et al.

(10) Patent No.: US 11,159,072 B2
(45) Date of Patent: Oct. 26, 2021

(54) ELECTRICAL MACHINE

(71) Applicant: Robert Bosch GmbH, Stuttgart (DE)

(72) Inventors: Tobias Ruck, Stuttgart (DE); Erik Weissenborn, Stuttgart (DE); Dimitra Neufeld, Asperg (DE); Sebastian Udich, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 421 days.

(21) Appl. No.: 16/205,566

(22) Filed: Nov. 30, 2018

(65) Prior Publication Data

US 2019/0165640 A1  May 30, 2019

(30) Foreign Application Priority Data

Nov. 30, 2017 (DE) ...................... 10 2017 221 580.1

(51) Int. Cl.
*H02K 5/20* (2006.01)
*H02K 7/14* (2006.01)
(Continued)

(52) U.S. Cl.
CPC .................. *H02K 5/20* (2013.01); *H02K 7/14* (2013.01); *H02K 7/1823* (2013.01); *H02K 9/06* (2013.01);
(Continued)

(58) Field of Classification Search
CPC .......... H02K 9/06; H02K 5/20; H02K 11/215; H02K 11/30; H02K 13/003;
(Continued)

(56) References Cited

U.S. PATENT DOCUMENTS

2007/0023421 A1*  2/2007  Kitamura ................. H02K 9/06
                                                                    219/623
2013/0164158 A1*  6/2013  Matsuba .................. F04D 17/16
                                                                    417/410.1
(Continued)

FOREIGN PATENT DOCUMENTS

DE    102012201644         8/2013
DE    102012206898 A1 * 10/2013  ............... H02K 9/06

OTHER PUBLICATIONS

Lober et al, Electric Machine e.g. electric steering motor for motor vehicle, Oct. 31, 2013, Robert Bosch GMBH, DE 102012206898 (English Machine Translation) (Year: 2013).*

*Primary Examiner* — Quyen P Leung
*Assistant Examiner* — Alexander A Singh
(74) *Attorney, Agent, or Firm* — Michael Best & Friedrich LLP

(57) ABSTRACT

An electrical machine (10), in particular a machine which can be operated in electric generator mode and/or in electric motor mode, comprising a rotor (14) which has a shaft (13), wherein a part of a turbomachine (68) is formed on the shaft (13) and the part is a fan (60), wherein the fan (60) has a circumference (83) with a circumferential direction (85), and a housing (63) of an electrical unit (45) is adjacent to the fan (60) and serves as a housing of the turbomachine (68), and there is a gap (65) between the fan (60) and the housing (63) of the electrical unit (45), characterized in that the gap (65) has a radial width (B65R) which has a different magnitude depending on a circumferential position (U602) on the fan (60) which is arranged on the shaft (13).

8 Claims, 3 Drawing Sheets

(51) Int. Cl.
*H02K 9/06* (2006.01)
*H02K 11/215* (2016.01)
*H02K 11/30* (2016.01)
*H02K 13/00* (2006.01)
*H02K 7/18* (2006.01)
*H02K 11/33* (2016.01)
*F01D 25/12* (2006.01)
*F01D 15/10* (2006.01)

(52) U.S. Cl.
CPC .......... *H02K 11/215* (2016.01); *H02K 11/30* (2016.01); *H02K 11/33* (2016.01); *H02K 13/003* (2013.01); *F01D 15/10* (2013.01); *F01D 25/12* (2013.01); *F05D 2220/30* (2013.01); *F05D 2240/10* (2013.01); *F05D 2260/221* (2013.01); *H02K 2211/03* (2013.01)

(58) Field of Classification Search
CPC ........ H02K 2211/03; H02K 7/14; H02K 9/00; H02K 9/02; H02K 9/04; H02K 9/08; H02K 9/10; H02K 9/12; H02K 9/14; H02K 9/16; H02K 9/18; H02K 9/28; F01D 25/12; F01D 15/10; F05D 2260/221; F05D 2240/10
USPC ..... 310/40.5, 62, 63, 52, 53, 55, 57, 58, 59, 310/60 R
See application file for complete search history.

(56) References Cited

U.S. PATENT DOCUMENTS

2013/0200757 A1* 8/2013 Schroeder ............ H02K 11/215
310/68 B
2015/0260200 A1* 9/2015 Dreesen ................ F04D 29/164
415/220

* cited by examiner

ELECTRICAL MACHINE

BACKGROUND OF THE INVENTION

Published German Patent Application DE 10 2012 201 644 A1 discloses an electrical machine which has a rotor and a shaft, wherein a part of a turbomachine in the form of a fan is formed or mounted on the shaft in the case of a rotation speed encoder. Said fan serves to convey air and in this way dissipate heat at the adjacent wall of a housing of an electrical unit.

SUMMARY OF THE INVENTION

According to a first aspect of the invention, provision is made for a gap or air gap between the fan at the end of the shaft and the contour of the adjoining housing to not be rotationally symmetrical. Instead, provision is made for the gap to have a radial width which has a different magnitude depending on a circumferential position on the fan which is arranged on the shaft. In particular, the gap should be formed in such a way that, at an absolute circumferential position of an envelope of the fan, the gap has a radial width which, at another point of an absolute circumferential position, has a different radial width.

According to a further aspect of the invention, provision is made for the gap to continually increase at least in sections in the circumferential direction. In particular, this occurs in the rotation direction of the rotation axis. This leads to the air being drawn into the small gap section and being expelled again in the large or wide gap section. Overall, this results in a transverse flow on average, said transverse flow flowing past the axial end of the fan and in this way cooling a housing base of the electrical unit or of the control device or electronic unit. According to a further aspect of the invention, provision is made for the fan to be arranged opposite a housing base of the electrical unit, wherein the housing base is arranged between the fan and a heat-generating structural element. An arrangement of this kind leads to the housing base being effectively cooled and, owing to this effect, the structural element which is arranged above said housing base or the heat-generating structural element which is arranged on the housing base being more effectively cooled in turn. According to a further aspect of the invention, provision is made for the housing base to have a uniform thickness over the diameter of the fan. A uniform thickness of this kind has the advantage that, as a result, it is easier to render possible uniform heat dissipation out of the housing base. As a result, cooling of a heat-generating structural element which is arranged above said housing base is more uniform at least at the beginning.

A circular envelope of the fan can be surrounded by a circular cutout. However, it can also be arranged, for example, in an oval or elliptical or some other mirror-symmetrical or non-symmetrical cutout too.

Overall, the invention leads to a possible dead flow region between the end of the shaft and the housing base being avoided. Since, in the case of the solution according to the prior art, the situation can occur of so-called circular flow, that is to say flow in a circle, forming in the end-side air gap between the fan and the housing base, the exchange of air with the surrounding area is either severely reduced or even completely prevented, so that little heat is transferred to the air in this region according to the prior art.

BRIEF DESCRIPTION OF THE DRAWINGS

The invention will be explained in more detail below with reference to the figures shown.

Identical components are provided with the same reference numerals throughout the figures.

DETAILED DESCRIPTION

Figure 1:
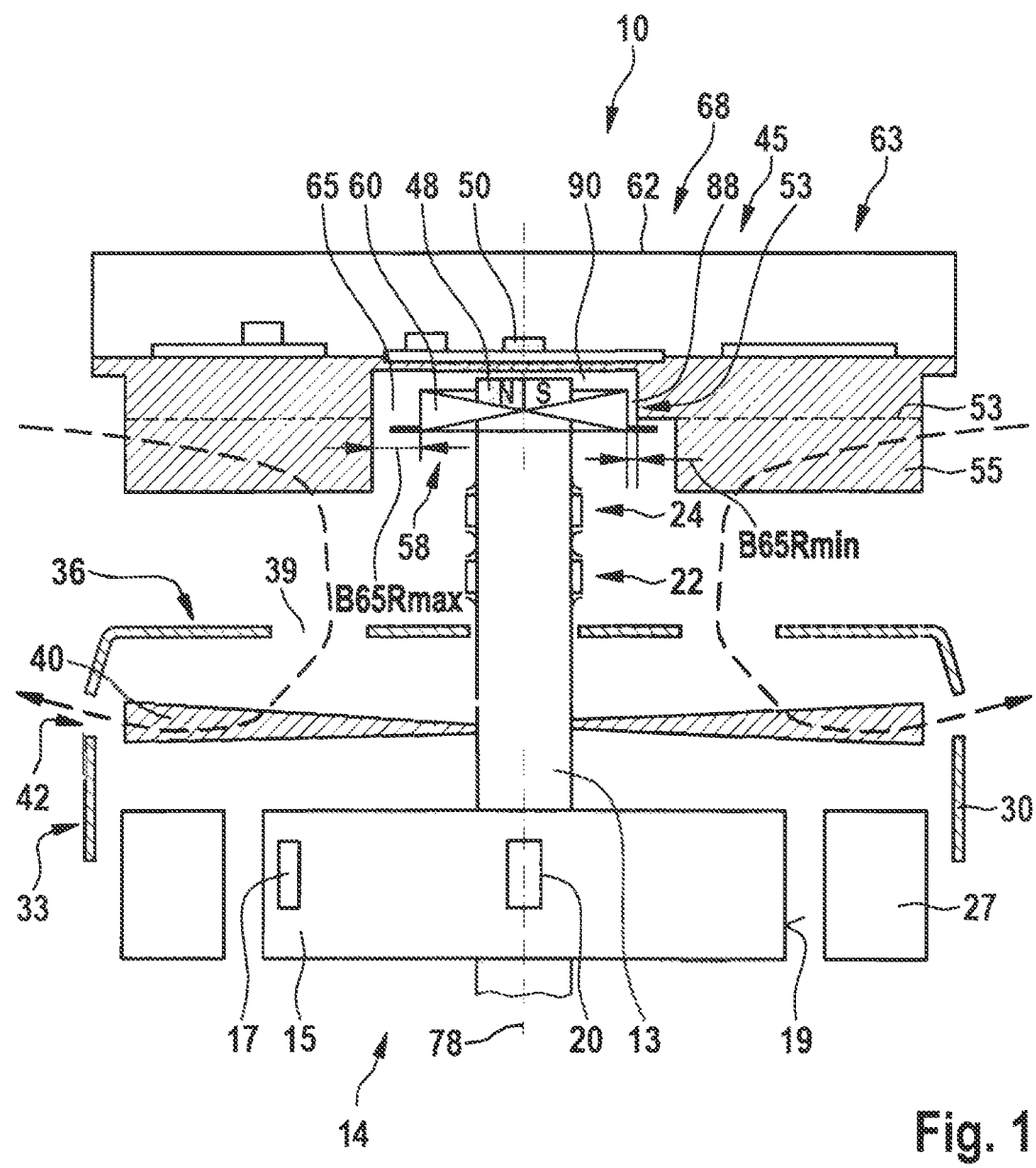
FIG. 1 shows a schematic illustration of an electrical machine in a partial longitudinal section.

FIG. 1 schematically illustrates an electrical machine 10 in a partial longitudinal section. It should be noted that FIG. 1 corresponds to FIG. 1 of DE 10 2012 201 644 A1, which is discussed above, but some details are not illustrated here in comparison with the illustration from the prior art. The electrical machine 10 is a machine which can be operated, for example, in electric motor mode or, as an alternative, also in electric generator mode, that is to say said electrical machine 10 can be operated exclusively as an electric motor or exclusively as an electric generator or sometimes as an electric generator and sometimes as an electric motor. Said electrical machine has a shaft 13 on which an electromagnetic circuit 15 is connected in a rotationally fixed manner to the shaft 13. Said electromagnetic circuit has an excitation system 17. Said excitation system 17 has poles which are arranged alternately over the circumference 19 and can be electromagnetically excited by a field coil 20, not shown here. As in the prior art, the poles can be embodied, for example, as claw poles. Said field coil 20 is usually energized by means of two slip rings 22, 24. Electrical connecting conductors, which are present, between the slip rings 22, 24 and the field coil 20 are not illustrated here. A so-called stator 27 is arranged outside the circumference 19 of the electromagnetic circuit 15, said stator, by way of example, here having a stator iron, not designated in any detail, having slots and teeth which are directed radially inward toward the excitation system 17, wherein a usually multiple-section stator winding is inserted into the slots, not designated in any detail. Said multiple-section stator winding can have, for example, three, five or six sections. The stator 27 is situated in a so-called brush-side end plate 30 and is fixedly held there. Here, the end plate 30 has a part which is designated holder 33 and in which the stator 27 is inserted such that it is held. Furthermore, the end plate 30 has the actual plate part 36 which, by way of a hub not shown here, holds a roller bearing, likewise not shown, the shaft 13 being mounted in a supporting and rotatable manner in the central section of said roller bearing. The plate part 36 has one or more intake openings 39 through which cooling air is drawn into the end plate 30 by means of a main fan 40. In the process, said cooling air cools, amongst other things, end windings, not illustrated here, of the abovementioned stator winding. Said cooling air exits from the end plate 30 and therefore from the electrical machine 10, for example, through outlet openings 42. The main fan 40 mentioned here is a fan which, given this usual design, is arranged between the plate part 36 of the end plate 30 and the electromagnetic circuit 15. In this case, the two slip rings 22, 24 are energized by sliding contacts (carbon brushes), not illustrated here. In a machine of this kind, a current which is transmitted in the process, also called field current, is influenced, for example, by a regulator which is influenced taking into account a voltage output by the stator winding. The voltage which is output by the stator winding, an AC voltage, is rectified by means of a rectifier, likewise not illustrated here, and passed on to a starter battery or battery when used in a motor vehicle, for example by means of a charging cable.

FIG. 1 shows, in this context, an electrical unit 45 which has the task of regulating a field current of the field coil 20 and, for example, also rectifying the alternating current which is output by the stator winding. Furthermore, said electrical unit 45 is able to actuate the stator windings in such a way that a driving torque is implemented on the rotor 14 by the stator 27 depending on a specific rotation position of the rotor 14. The exact position of the rotor 14 and its excitation system 17 in relation to the stator 27 is ascertained, for example, with the aid of a rotation angle encoder 48. To this end, said rotation angle encoder 48 has, for example, a permanent magnet, not designated in any detail here, which has, for example, two magnetic poles, a north pole N and a south pole S. A relative position of the rotation angle encoder 48 in relation to the excitation system 17 is precisely known. Therefore, rotation position state information which is important for the functioning of the electronic unit 45 can be ascertained and processed by means of a rotation angle sensor 50 and supporting electronics. This is important, for example, for operation of the machine 10 in electric motor mode since the individual sections of the stator winding can be actuated using this information in order to set the rotor 14 in rotation and to set a crankshaft of an internal combustion engine, not illustrated here, in initial rotation, and therefore to start the internal combustion engine for example, by means of an exemplary belt pulley, not illustrated here, and a coupled belt drive. The electrical unit 45 has, amongst other things, a heat sink 53. Said heat sink has cooling fins 55 which are indicated in FIG. 1. Intermediate spaces, not illustrated here, which are oriented substantially from radially outside to radially inside in relation to the shaft 13 are located between said cooling fins 55. Air which is driven by the main fan 14, indicated by the thick dashed lines, is drawn both through said intermediate spaces and also, as already mentioned, through the intake opening 39 and the outlet opening 42. A cutout 58 is located in a central region of the heat sink 53. The structural unit, which is fitted with the rotation angle encoder 48 and a small fan, the fan 60, protrudes into said cutout 58. The heat sink 53 is, like a protective cap 62, part of a housing 63 of the electrical unit 45. The fan 60 therefore protrudes into the cutout 58 as part of the housing 63. A part of the cutout 58, and here very particularly that part of the cutout 58 which, together with the fan 60, forms a gap 65 as seen radially outward from the fan 60 and as seen axially outward from the fan 60, is therefore jointly a turbomachine 68 and the housing 63, accordingly a turbomachine housing.

Figure 2:
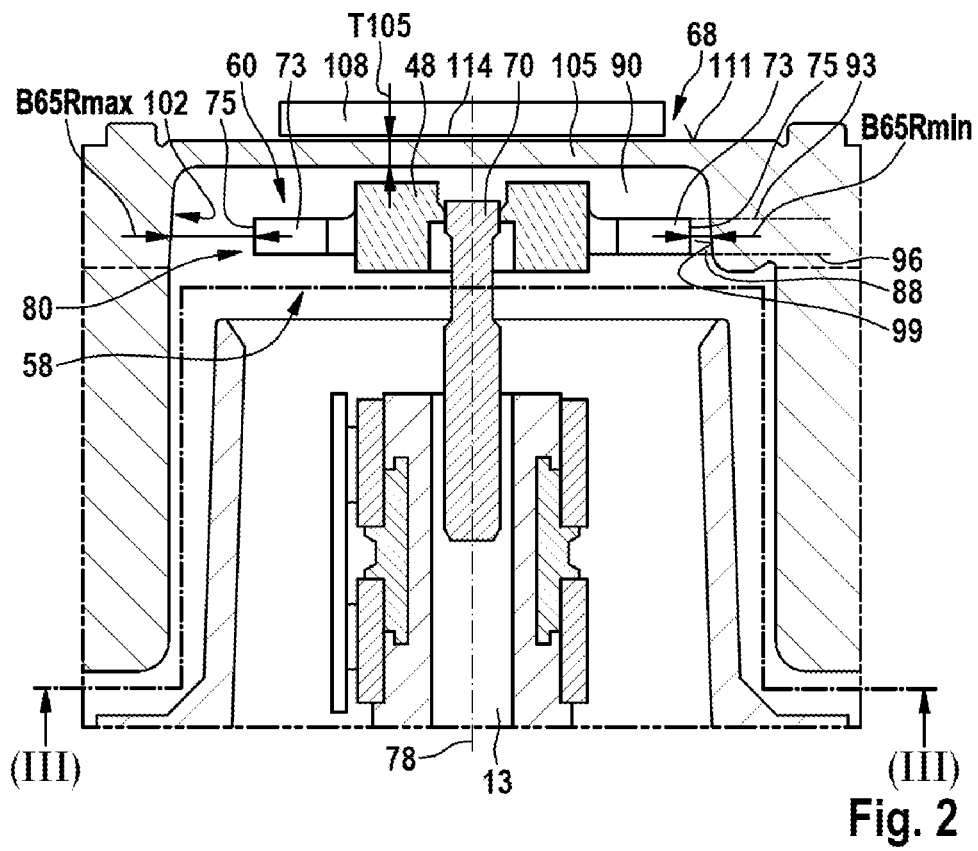
FIG. 2 shows a detail of the electrical machine from FIG. 1, likewise in a longitudinal section.

FIG. 2 shows a detailed illustration of an exemplary embodiment of said turbomachine 68. The cutout 58 is clearly shown. The rotation angle encoder 48 is situated on a pin 70 which is seated, by way of that end which is averted from the rotation angle encoder 48, in a bore of the shaft 13. A fan contour is integrally formed on the outer circumference of the rotation angle encoder 48 by being injection-molded or molded-on, so that the fan 60 is realized here. Two fan blades 73 are clearly shown in the figure. The fan blades 73 each have an extreme end 75. Said extreme ends rotate with the shaft 13 about the rotor axis 78. If the fan 60 rotates about said rotor axis 78, the extreme ends 75 of the fan 60 form an envelope curve 80. If the extreme ends 75 of the fan blades 73 are, for example, all at the same distance away from the rotor axis 78, said extreme ends 75 form a cylindrical lateral surface. Said envelope curve 80 therefore also constitutes a circumference 83. This orientation of the circumference 83 therefore also produces a circumferential direction 85, compare with FIG. 3. The gap 65 has both a radial component, a radial gap 88 which surrounds the fan 60 in the radial direction, and also an axial gap 90 (also see FIG. 1, FIG. 2).

Figure 3:
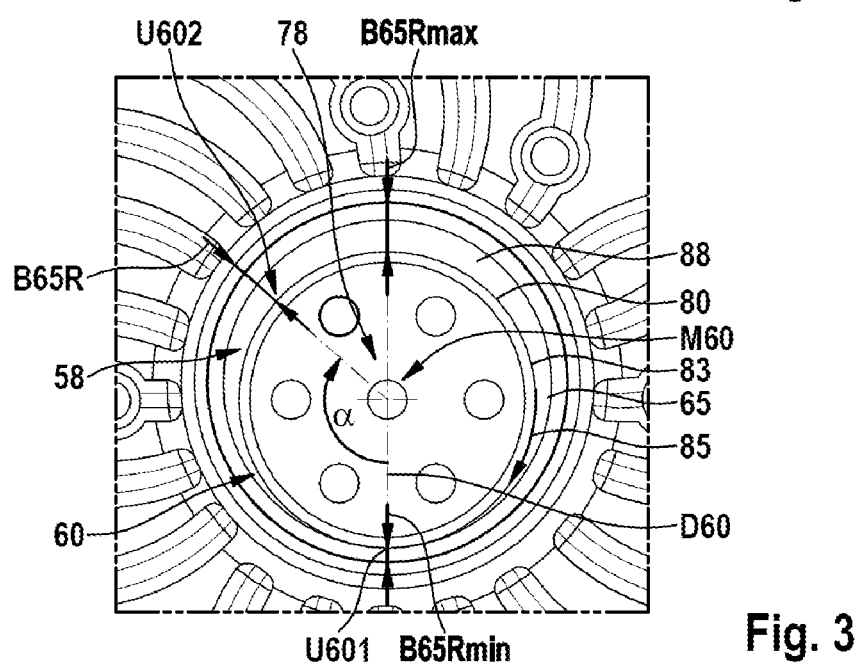
FIG. 3 shows, in principle, an illustration of a detail of an electrical machine in cross section analogous to the profile of the cross-sectional line (III)-(III), but using a fan configuration which differs from the configuration according to FIG. 2.

As is clearly shown in FIGS. 1, 2 and 3, the gap 65 has a radial width B65R. FIGS. 1, 2 and 3 each clearly show that this gap 65 has both a minimum radial width B65Rmin and a maximum radial width B64Rmax. In general, the radial width of this gap 65 is designated radial width B65R, FIG. 3. As is shown both in FIG. 1 and in FIG. 2 and very particularly in FIG. 3, the gap 65 has a radial width B65R which has a different magnitude depending on a circumferential position on the fan 60 which is arranged on the shaft 13. In this case, the circumferential position indicated here is, for example starting from the rotor axis 78, provided as a center for determining the circumferential position. A kind of reference line for said process of determining the position on the circumference of the fan 60 is provided in a specific line here. As is clear from what has already been explained above, there is a maximum dimension of a radial gap or a width of the gap 65 in the radial direction B65Rmax and a minimum dimension of a gap B65 in the radial direction, B65Rmin given the arrangement of fan 60 and the cutout 58. In accordance with what has been presented and described up until this point, it is clear that these two extreme dimensions lie on one line. Said line is a diameter line D60, that is to say said diameter line D60 is partially congruent with the diameter dimension or the diameter of the fan 60 in this position. A middle point M60 of the diameter of the fan 60 lies on the rotor axis 78. If it is assumed as the starting base line for determining the position on the circumference 83 of the rotor 60 that the connecting line lies between the middle point M60 and the minimum dimension of the gap 65, the dimension B65Rmin, and rotation is performed in the corresponding radius between M60 and a first point U601 on the circumference 83 in a clockwise direction through the angle α, a further general position U602 on the circumference is produced. It is very clearly shown here that the gap 65 has a radial width B65R which has a different magnitude depending on a circumferential position U602 on the fan 60 which is arranged on the shaft 13.

Therefore, this document discloses an electrical machine 10, in particular a machine which can operate in electric generator mode and/or electric motor mode, comprising a rotor 14 which has a shaft 13, wherein a part of a turbomachine 68 is formed on the shaft 13. The part is a fan 60, wherein the fan 60 has a circumference 83 with a circumferential direction 85. A housing 63 of an electrical unit 45 is adjacent to the fan 60 and serves as a housing of a turbomachine 68. There is a gap 65 between the fan 60 and the housing 63 of the electrical unit 45. The gap 65 has a radial width B65R which has a different magnitude depending on a circumferential position U602 on the fan 60 which is arranged on the shaft 13. As is shown very particularly in FIG. 3, the gap continually increases at least in sections in the circumferential direction 85. Starting here, for example conceptually, at the circumferential position U601, said figure shows that, in the clockwise direction, the gap 65 initially continuously increases (up to B65Rmax) in a first section in the circumferential direction 85 and then continuously decreases in sections or in other words: in this exemplary embodiment, the gap 65 increases over a first, half section in the circumferential direction 85 and continuously decreases over a second, different half section. In this particular embodiment, the gap 65 is formed in such a way that it is formed with mirror symmetry in relation to an axis, the diameter line D60, through the rotation axis 78. Here, the statement that the gap 65 continuously increases in sections in the circumferential direction 85 and, respectively, the gap 65 is formed with mirror symmetry in relation to a plane along the rotation axis 75 relates, in particular, to the so-called radial gap 88 which is a part of the gap 65. This radial gap 88 very particularly has a volume which is a difference of second volumes. To this end, a first line 93 and a second line 96 are shown in FIG. 2. Both lines 93, 96 represent in each case one plane which is arranged perpendicularly in relation to the rotation axis 78. Said two planes which are represented by said lines 93, 96, the envelope curve 80 and a line which is designated taper line 99 here define the volume of the radial gap 88. In this context, a first volume is a cylinder volume with a central cylinder axis which coincides with the rotor axis 78. A second volume is defined by the rotation or the rotor axis 78 and the taper line 99. It is assumed here that a central height of a truncated cone with the taper line 99 (truncated cone lateral line) defines a second volume, a truncated cone-shaped volume. The volume of the radial gap 88 is therefore determined as the difference between the volume with the truncated-cone shape and the volume formed by the envelope curve 80. A contour 102 of the housing of the turbomachine 68 therefore tapers in the direction of the rotor axis 78, in particular to a base 105 of the housing 63. As shown in FIG. 2, the fan 60 is arranged opposite a base 105 of the housing 63 of the electrical unit 45. In this case, the base 105 of the housing 63 is arranged between the fan 60 and a heat-generating structural element 108. It should be noted here that the rotation angle sensor 50 and the structural element 108 can both be arranged opposite the fan 60. While the rotation angle sensor 50 is particularly preferably arranged directly opposite the rotation angle encoder, the heat-generating structural element 108 can, for example, also be arranged opposite the fan 60. In this case, the rotation angle sensor 50 and the structural element 108 are arranged in a manner offset simply one behind the other on a plane 111. Therefore, the rotation angle sensor 50 could be, for example, on the plane 111 in front of the structural element 108 (FIG. 2). Moreover, a thermally conductive layer is applied between the structural element 108 and the base 105. As illustrated in FIG. 2, provision is particularly preferably made for the base 105 of the housing 63 to have a uniform thickness T105 over the diameter of the fan 60.

The design can also differ from the exemplary design according to FIGS. 1, 2 and 3: while a circular envelope is surrounded by a circular cutout 58 above, according to another exemplary embodiment, the cutout can also be of oval or elliptical or some other mirror-symmetrical or non-symmetrical design for example. If, in general, the envelope is arranged in a manner offset from a line of mirror symmetry, which may be present, of the cutout, a diameter line D60 is offset from the line of mirror symmetry. In this case, there is an angle which is not equal to 180 angular degrees between a line through the largest gap 65 and the middle point M60 and between a line through the middle point M60 and the smallest dimension of the gap 65.

Figure 4:
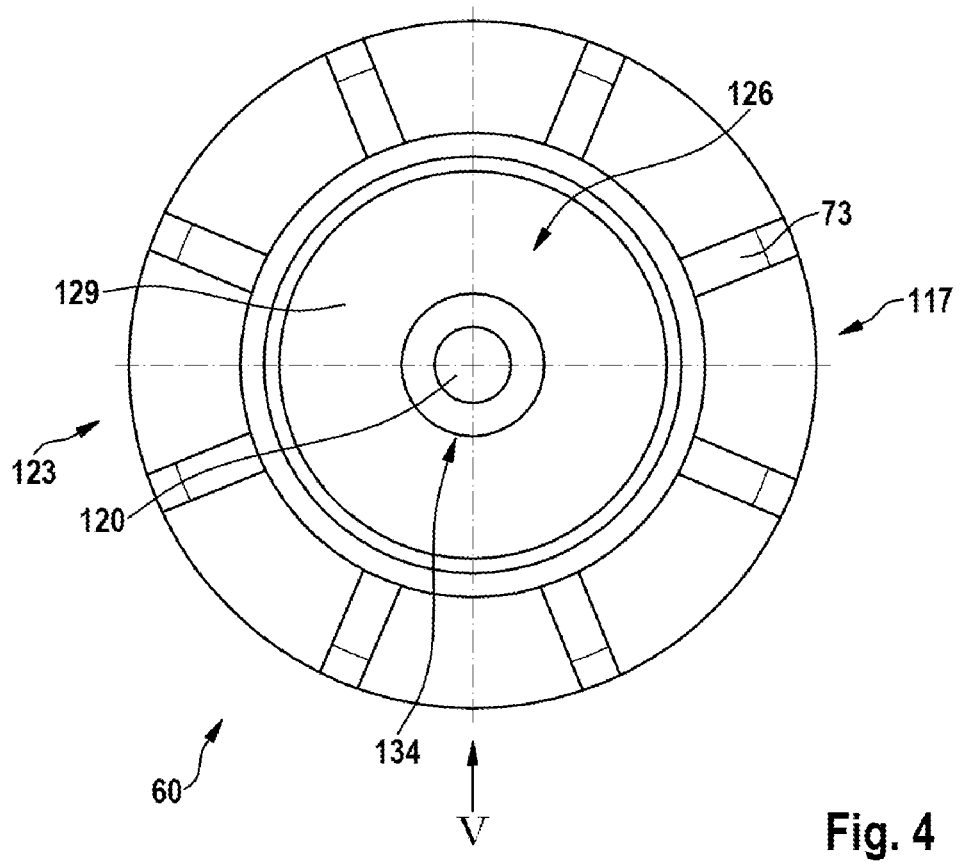
FIG. 4 shows the fan according to FIG. 3 in plan view, that is to say a view from the other side in relation to FIG. 3.

FIG. 4 shows a plan view of the fan 60 from FIG. 3. In relation to FIG. 3, said plan view is that side of the fan 60 which is not shown in FIG. 3.

Figure 5:
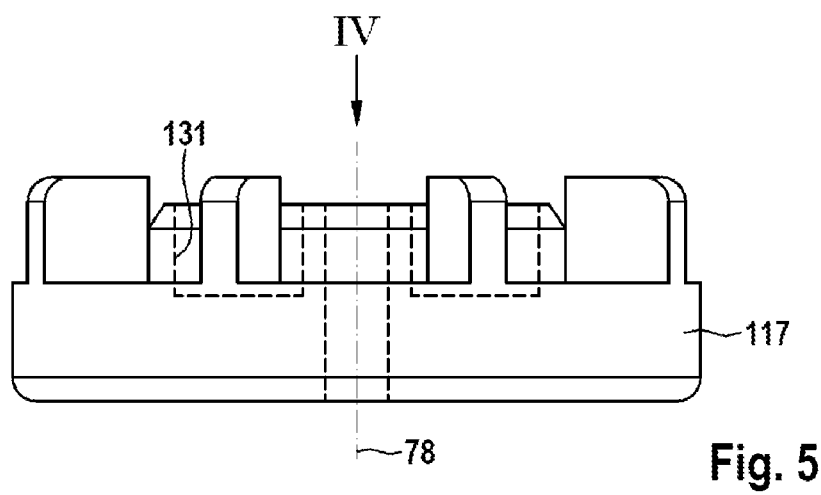
FIG. 5 shows a side view of the fan from FIG. 3 and FIG. 4.

FIG. 5 shows a side view of the fan 60 from FIG. 4. Said fan has a substantially cylindrical or hollow-cylindrical base 117. Said base 117 has a passage hole 120 in its center. Said passage hole provides fastening of the fan 60 on the pin 70. Fan blades 73, here in particular eight fan blades 73 which are additionally uniformly spaced apart, are arranged on an outer annular surface section 123. An inner annular surface section 126 adjoins the inside of said annular surface section 123. Said inner annular surface section 126 is a base of an annular receptacle 129 for the rotation angle encoder 48. A contour 131 of said receptacle 129 is indicated as shown in FIG. 5 for example. It is clear from said contour and also from FIG. 4 that the contour 131 delimits a hub-like section 134 radially to the inside. Said hub-like section has the abovementioned passage hole 120 in its interior.

What is claimed is:

1. An electrical machine (10), comprising a rotor (14) which has a shaft (13), wherein a fan (60) is formed on the shaft (13) and has a rotation axis (78), wherein the fan (60) is a part of a turbomachine (68) and has a circumference (83) with a circumferential direction (85), wherein a housing (63) of an electrical unit (45) includes a cutout (58) into which the fan (60) protrudes, the housing (63) serving as a housing of the turbomachine (68), wherein a centerline of the cutout (58) is spaced apart from the rotation axis (78), and wherein a gap (65) between the fan (60) and the housing (63) has a radial width (B65R) which has a different magnitude depending on a circumferential position (U602) on the fan (60).

2. The electrical machine (10) according to claim 1, characterized in that the gap (65) continually increases at least in sections in the circumferential direction (85).

3. The electrical machine (10) according to claim 1, characterized in that the gap (65) is formed with mirror symmetry in relation to a plane along the rotation axis (78).

4. The electrical machine (10) according to claim 1, characterized in that the gap (65) is formed in a non-symmetrical manner in relation to a plane along the rotation axis (78).

5. The electrical machine (10) according to claim 1, characterized in that the fan (60) is arranged opposite a base (105) of the housing (63) of the electrical unit (45), wherein the base (105) is arranged between the fan (60) and a heat-generating structural element (108).

6. The electrical machine (10) according to claim 5, characterized in that the base (105) of the housing (63) has a uniform thickness (T105) over a diameter of the fan (60).

7. The electrical machine (10) according to claim 1, wherein the machine is configured to be operated in electric generator mode and/or in electric motor mode.

8. The electrical machine (10) according to claim 1, wherein the cutout (58) is cylindrical.

* * * * *